United States Patent Office 3,842,085
Patented Oct. 15, 1974

3,842,085
SUBSTITUTED PYRANO[2,3-b]PYRANS AND
PROCESS FOR THEIR PRODUCTION
Max von Strandtmann, 47 Erie Ave., White Meadow Lake, Rockaway, N.J. 07866; Marvin P. Cohen, 420 Luhman Drive, New Milford, N.J. 07646; and John Shavel, Jr., Yardley Place, Mendham, N.J. 07945
No Drawing. Original application Feb. 4, 1972, Ser. No. 112,830, now Patent No. 3,752,830. Divided and this application Nov. 30, 1972, Ser. No. 311,025
Int. Cl. C07d 33/46
U.S. Cl. 260—289 R    2 Claims

ABSTRACT OF THE DISCLOSURE

The present invention discloses novel substituted pyrano [2,3-b]pyrans of Formula I below:

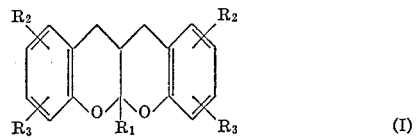

wherein $R_1$ is a disubstituted amine, $R_2$ and $R_3$ are H, alkyl, halo, lower alkoxy, aryloxy, aralkyloxy, or $R_2$ and $R_3$ taken together with the aromatic ring form a second aromatic or heteroaromatic ring.

The compounds of this invention possess bronchodilator properties.

---

The present invention is concerned with pyrano[2,3-b] pyrans of Formula I:

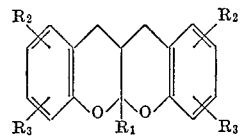

wherein $R_1$ is a disubstituted amine, such as the radical of dimethylamine, diethylamine, pyrrolidine, piperidine, piperazine, and morpholine; $R_2$ and $R_3$ are hydrogen, lower alkyl, aryl, aralkyl, aralkyledene, lower alkoxy, aryloxy, aralkyloxy, halo, acetamido, or $R_2$ and $R_3$, taken together with the nucleus, form an additional aromatic or heteroaromatic ring.

As used throughout the specification and claims:

The term "lower alkyl" and the lower alkyl portion of lower alkoxy embraces both straight and branched chain alkyl radicals containing from 1 to 6 carbon atoms, for example, methyl, ethyl, propyl, isopropyl, n-butyl, n-amyl, n-hexyl, 2-ethylbutyl, 2,3-dimethylbutyl, and the like; the term "aryl" denotes a monocyclic aromatic hydrocarbon of 6 to 8 carbon atoms, such as phenyl, tolyl and the like; the term "aralkyl" encompasses lower alkyl groups in which aryl as defined above is substituted for a hydrogen atom, such as for example, benzyl, phenethyl and the like; the term "aralkyledene" includes lower alkenyl groups in which aryl as defined above is substituted for a hydrogen atom e.g. styryl. The term "heteroaromatic" encompasses those 5 and 6 member heterocyclic rings having at least one hetero atom in the ring such as nitrogen, oxygen or sulfur, for example, pyridyl, thienyl, furyl and the like; and the term "halogen" encompasses all four halogens, e.g. fluorine, bromine, chlorine and iodine.

The symbols $R_1$, $R_2$, and $R_3$ as used hereinafter have the same meaning as described above.

The compounds of this invention exhibit bronchodilator activity and are indicated symptomatic relief of bronchial asthma. For example, the compounds of the invention when administered into a mammalian host such as guinea pigs whose bronchioles have been constricted by the injection of agents such as histamine, serotonin or acetylcholine are capable of providing dilation at a dose level of about 25 mg./kg. For a full discussion of this test protocol, see J. Pharmacol. and Exptl. Therap., 90, 254 (1949).

In order to use these compounds, they are formulated with pharmaceutical diluents such as lactose, mannitol and the like to form dosage forms such as tablets, capsules and the like. They can also be formulated with vehicles such as peanut oil, sesame oil, into dosage forms suitable for parental administration.

Generally speaking, a dosage regimen of about 5 mg./ kg. to 50 mg./kg. daily is prescribed to provide symptomatic relief of asthma. This regimen can be varied according to the weight and species of the animal being treated, but is within the above described range.

The compounds of this invention are prepared by allowing to react a Mannich base of formula II with a ketene aminal of formula III:

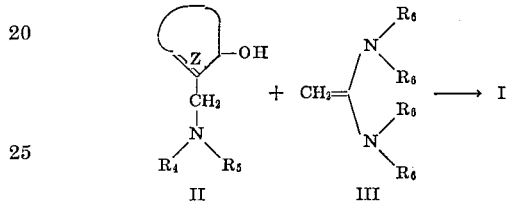

wherein $R_4$, $R_5$ and $R_6$ are alkyl, aralkyl, aryl or taken together with the nitrogen form piperidine, morpholine, pyrrolidine or piperazine rings and Z is an aromatic or heteroaromatic nucleus. This reaction is usually carried out by refluxing the reactants in an inert solvent.

Upon hydrolysis, compounds of type I undergo ring cleavage to give compounds of type IV, which are also within the scope of this invention.

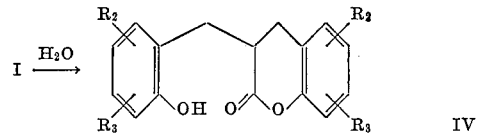

These compounds are also useful as bronchioles. The ketene aminals of formula III are prepared according to a procedure described in Chem. Ber. 95, 2096 (1962) and 97, 3076, 3081 (1964). The phenolic Mannic bases of type II are prepared according to standard methods described in Org. Reactions, 1, 303 (1942).

EXAMPLE 1

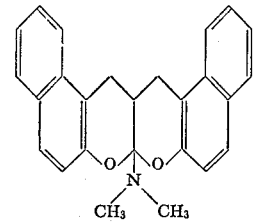

7a-(Dimethylamino)-15a,16-dihydro-7aH,15H-naphtho [1,2-e]naphthol[1′,2′:5,6[pyrano]2,3-b]pyran A solution of 10 g. of 1-dimethylaminomethyl-2-naphtho,[1] and 2.85 g. of 1,1-dimethylaminoethene in 25 ml. of dioxane was refluxed under a stream of nitrogen for 3 hr. The dioxane was removed under reduced pressure and the crystalline residue was recrystallized from abs. ethanol, m.p. 220.22°; yield 3 g. (31%);

Anal. Calcd. for $C_{26}H_{23}NO_2$: C, 81.86; H, 6.08; N, 3.67. Found: C, 81.91; H, 6.25; N, 3.95.

---

[1] K. Auwers and A. Dombrowski, Liebigs Ann. Chem., 344, 280 (1906).

EXAMPLE 2

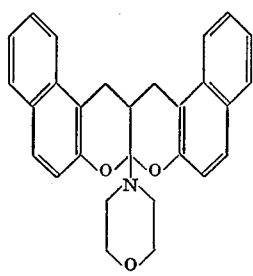

15a,16-Dihydro-7a-morpholino-7aH,15H-naphtho[1,2-e]naphthol[1',2':5,6]pyrano[2,3-b]pyran A mixture of 50 g. of 1-dimethylaminomethyl-2-naphthol[1] and 50 g. of 1,1-dimorpholinoethene in 250 ml. of dioxane was refluxed for 3 hr. under a stream of nitrogen. The dioxane was removed under reduced pressure, and the residual gum was recrystallized several times from abs. ethanol, m.p. 223–25, 246–47°; yield 10 g. (19%);

Anal. Calcd. for $C_{28}H_{25}NO_3$: C, 79.41; H, 5.95; N, 3.31. Found: C, 79.27; H, 6.08; N, 3.36.

EXAMPLE 3

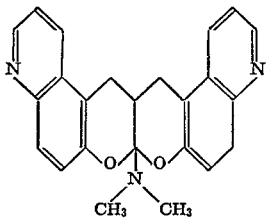

7a-(Dimethylamino)-15a,16-dihydro-7aH,15H-quino[5'',6'':5',6']pyrano[3',2':5,6]pyrano[3,2-f]quinoline A solution of 10 g. of 5-[(dimethylamino)methyl]-6-quinolinol[2] and 2.85 g. of 1,1-dimethylaminoethene in 25 ml. of dioxane was refluxed for 3 hr. under a stream of nitrogen. The dioxane was removed under reduced pressure, and the gummy residue was recrystallized from ethyl acetate with the aid of charcoal, m.p. 260–64°; yield 3.5 g. (37%).

Anal. Calcd. for $C_{24}H_{21}N_3O_2$: C, 75.18; H, 5.52; H, 10.96. Found: C, 75.40; H, 5.66; N, 10.96.

EXAMPLE 4

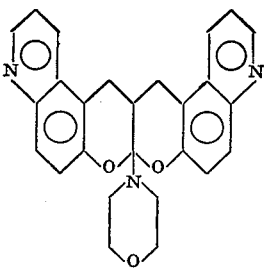

15a,16-dihydro-7a-morpholino-7aH,15H-quino[5'',6'':5',6']pyrano[3',2':5,6]pyrano[3,2-f]quinoline A solution of 5 g. of 5-[(dimethylamino)methyl]-6-quinlino,[2] and 5 g. of 1,1dimorpholino ethene in 25 ml. of dioxane was refluxed for 2 hr. under a stream of nitrogen. The solvent was then removed under reduced pressure, and the residual gum was taken up in ethyl acetate and chromatographed on a column of 400 g. of Florisil. The crystals found by concentration of early fractions were the dimethylamino analogue. Crystals in later fractions were recrystallized from $CH_3CN$, m.p. 239–43°.

Anal. Calcd. for $C_{26}H_{23}N_3O_3$: C, 73.39; H, 5.45; H, 9.88. Found: C, 73.05; H, 5.58; N, 9.58.

EXAMPLE 5

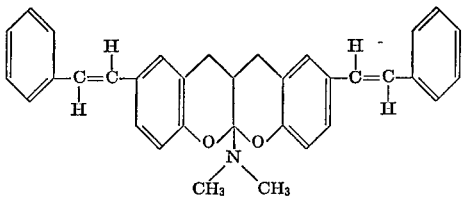

11a,12-Dihydro-5a-(dimethylamino)-2a-distyryl-5aH,11H[1]benzo-pyrano[2,3-b][1]benzopyran A solution of 4 g. of 1,1-dimorpholinoethene and 10 g. of 3-[(dimethylamino)methyl]-4-stilbenol] in 100 ml. of dioxane was refluxed under a stream of nitrogen for 48 hr. The solution was cooled, and the crystalline product was filtered off and recrystallized from $CH_3CN$, m.p. 217–22°.

Anal. Calcd. for $C_{32}H_{31}NO_2$: C, 83.26; H, 6.77; N, 3.03. Found: C, 82.98; H, 6.52; N, 2.93.

EXAMPLE 6

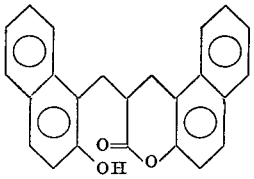

α-[(2-Hydroxy-1-naphthyl)methyl]-2-hydroxy-1-naphthalene acrylic acid δ lactone

A mixture of 10 g. of 7a-(dimethylamino)15a,16-dihydro-15H-naphtho[1,2 - e]naphtho[1',2':5,6]pyrano[2,3-b]pyran, 500 ml. of dioxane, and 50 ml. of 3N HCl was refluxed for 6 hr. The solvents were removed under reduced pressure, and the crystalline residue was recrystallized from $CH_3CN$, m.p. 215–20°; yield 6 g. (55%).

Anal. Calcd. for $C_{24}H_{18}O_3$: C, 81.34; H, 5.12. Found: C, 81.35; H, 5.21.

We claim:
1. A compound of the formula:

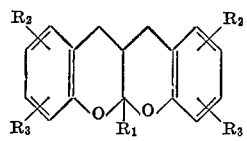

wherein $R_1$ is a disubstituted lower alkyl amino, and $R_2$ and $R_3$ taken together with the aromatic ring form quinoline ring systems.

2. A compound according to Claim 1 which is 7a-(Dimethylamino)-15a,16-dihydro-7aH,15H - quino[5'',6'':5',6']pyrano[3',2':5,6]pyrano[3,2-f]quinoline.

References Cited
UNITED STATES PATENTS
3,538,118   11/1970   Wang et al. _____ 260—345.2

DONALD G. DAUS, Primary Examiner

M. C. VAUGHN, Assistant Examiner

U.S. Cl. X.R.

260—288 R, 247.5, 293.51, 343.5, 345.2, 240 D; 424—258, 267, 283, 279, 248

---
[2] J. Org. Chem., 33, 4309 (1968).